(12) United States Patent
Watanabe

(10) Patent No.: US 8,797,962 B2
(45) Date of Patent: Aug. 5, 2014

(54) BASE STATION CONTROLLING APPARATUS AND COMMUNICATION SYSTEM

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 13/397,796

(22) Filed: Feb. 16, 2012

(65) Prior Publication Data
US 2012/0147875 A1 Jun. 14, 2012

Related U.S. Application Data

(63) Continuation of application No. PCT/JP2009/064889, filed on Aug. 26, 2009.

(51) Int. Cl.
- *H04W 4/00* (2009.01)
- *H04H 20/71* (2008.01)
- *H04L 12/56* (2006.01)
- *H04L 29/06* (2006.01)
- *H04W 28/06* (2009.01)

(52) U.S. Cl.
CPC ............ *H04L 69/04* (2013.01); *H04L 45/04* (2013.01); *H04W 28/06* (2013.01)
USPC .......................................... 370/328; 370/312

(58) Field of Classification Search
USPC .......................... 370/312, 331, 329, 338, 328
See application file for complete search history.

(56) References Cited

U.S. PATENT DOCUMENTS

| | | | |
|---|---|---|---|
| 2002/0091860 A1 | 7/2002 | Kalliokulju et al. | |
| 2003/0156559 A1* | 8/2003 | Yi et al. | 370/331 |
| 2005/0074024 A1 | 4/2005 | Kim et al. | |
| 2005/0118946 A1* | 6/2005 | Colban et al. | 455/3.06 |
| 2005/0165945 A1 | 7/2005 | Lee et al. | |
| 2007/0287392 A1* | 12/2007 | Sagne et al. | 455/119 |
| 2008/0019338 A1* | 1/2008 | Ishii et al. | 370/338 |
| 2008/0089265 A1 | 4/2008 | Park et al. | |
| 2009/0052407 A1* | 2/2009 | Motegi et al. | 370/336 |
| 2010/0110958 A1* | 5/2010 | Racz et al. | 370/312 |

FOREIGN PATENT DOCUMENTS

| | | |
|---|---|---|
| JP | 2004-517580 | 6/2004 |
| JP | 2005-528865 | 9/2005 |
| JP | 2007-502070 | 2/2007 |
| JP | 2008-99291 | 4/2008 |
| WO | 02/056561 | 7/2002 |

OTHER PUBLICATIONS

International Search Report dated Dec. 1, 2009, from corresponding International Application No. PCT/JP2009/064889.
3GPP TS 36.300 V8.6.0, Sep. 2009.

* cited by examiner

*Primary Examiner* — Hassan Phillips
*Assistant Examiner* — Saba Tsegaye
(74) *Attorney, Agent, or Firm* — Katten Muchin Rosenman LLP

(57) ABSTRACT

A base station controlling apparatus 10a that causes a plurality of base stations 12a to synchronously distribute a plurality of packet data to a mobile terminal, including: a receiver S12 that receives a plurality of packet data; a transition information generator S14 that generates transition information corresponding to a sequence number of packet data used for switching a compression state when the plurality of packet data are compressed; a compressor S20 that compresses the plurality of packet data based on the transition information; and a transmitter that transmits the plurality of compressed packet data to the plurality of base stations, and transmits the transition information to another base station controlling apparatus.

7 Claims, 19 Drawing Sheets

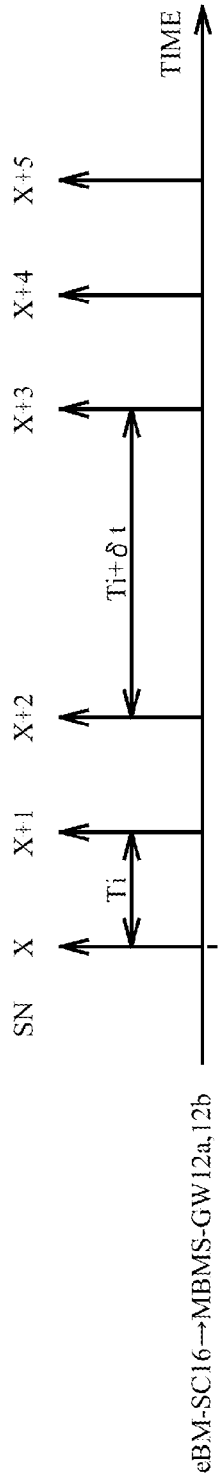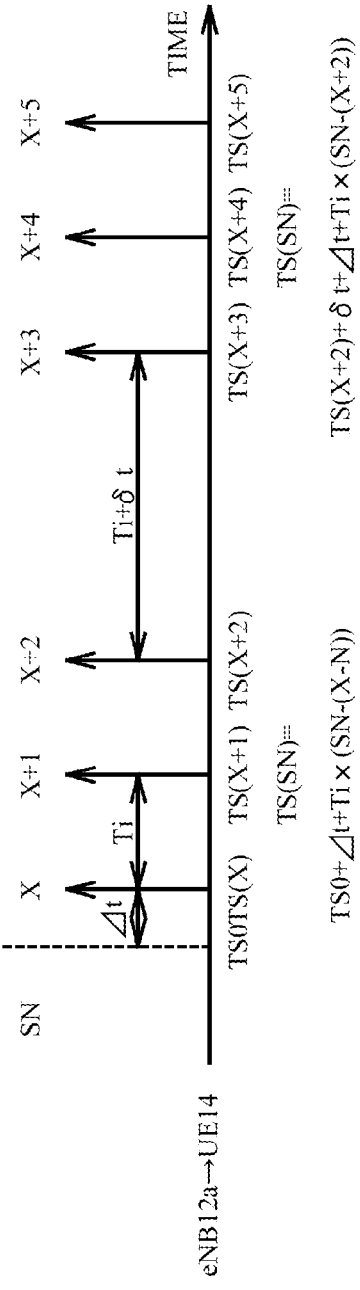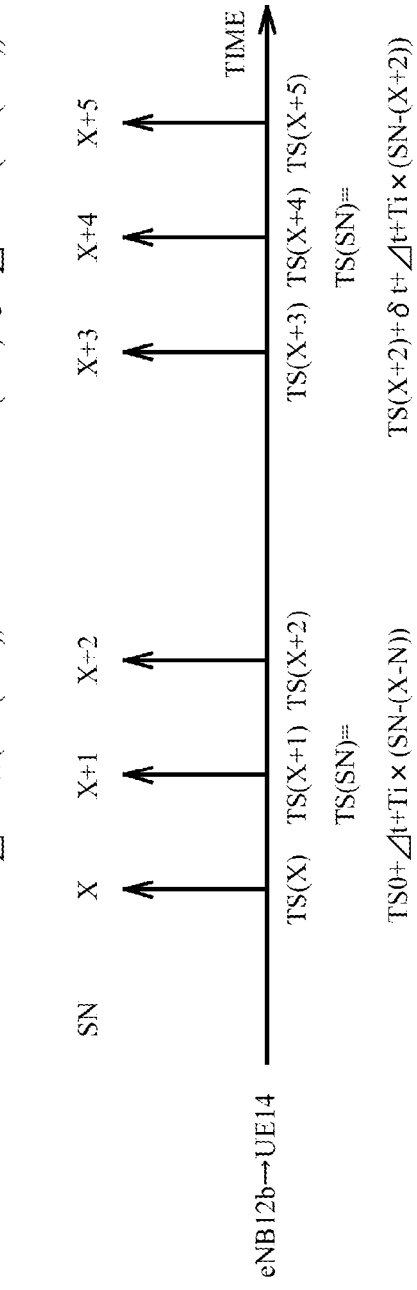
FIG. 9A
FIG. 9B
FIG. 9C

BASE STATION CONTROLLING APPARATUS AND COMMUNICATION SYSTEM

CROSS-REFERENCE TO RELATED APPLICATION

This application is a continuation application of PCT/JP2009/064889 filed Aug. 26, 2009, the contents of which are herein wholly incorporated by reference.

FIELD

A certain aspect of the embodiments is related to a base station controlling apparatus and a communication system.

BACKGROUND

In a mobile communication system such as 3GPP (3rd Generation Partnership Project), a service to perform data multi-destination delivery (multicast/broadcast) service for a plurality of mobile terminals is considered. For example, MBMS (Multimedia Broadcast Multicast Service) service is specified as the data multi-destination delivery service.

In the MBMS service, timings in which a plurality of base stations transmits MBMS signals to the mobile terminals are synchronized. Therefore, there is known a technique that an upper server transmits information indicative of the timing to a lower server, and the lower server transmits the information indicative of the timing to the plurality of base stations (e.g. Japanese Laid-open Patent Publication No. 2008-99291).

Moreover, in the MBMS service, it is considered to compress information of a header unit of the packet data, reduce consumption of radio bands and reduce encounter probability of radio errors.

SUMMARY

According to an aspect of the present invention, there is provided a base station controlling apparatus that causes a plurality of base stations to synchronously distribute a plurality of packet data to a mobile terminal, including: a receiver that receives a plurality of packet data; a transition information generator that generates transition information corresponding to a sequence number of packet data used for switching a compression state when the plurality of packet data are compressed; a compressor that compresses the plurality of packet data based on the transition information; and a transmitter that transmits the plurality of compressed packet data to the plurality of base stations, and transmits the transition information to another base station controlling apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A to 9C are diagrams illustrating relationship between corresponding information and synchronization information;

DESCRIPTION OF EMBODIMENTS

A description will be given of embodiments of the invention, with reference to drawings.

Embodiment 1

Figure 1:
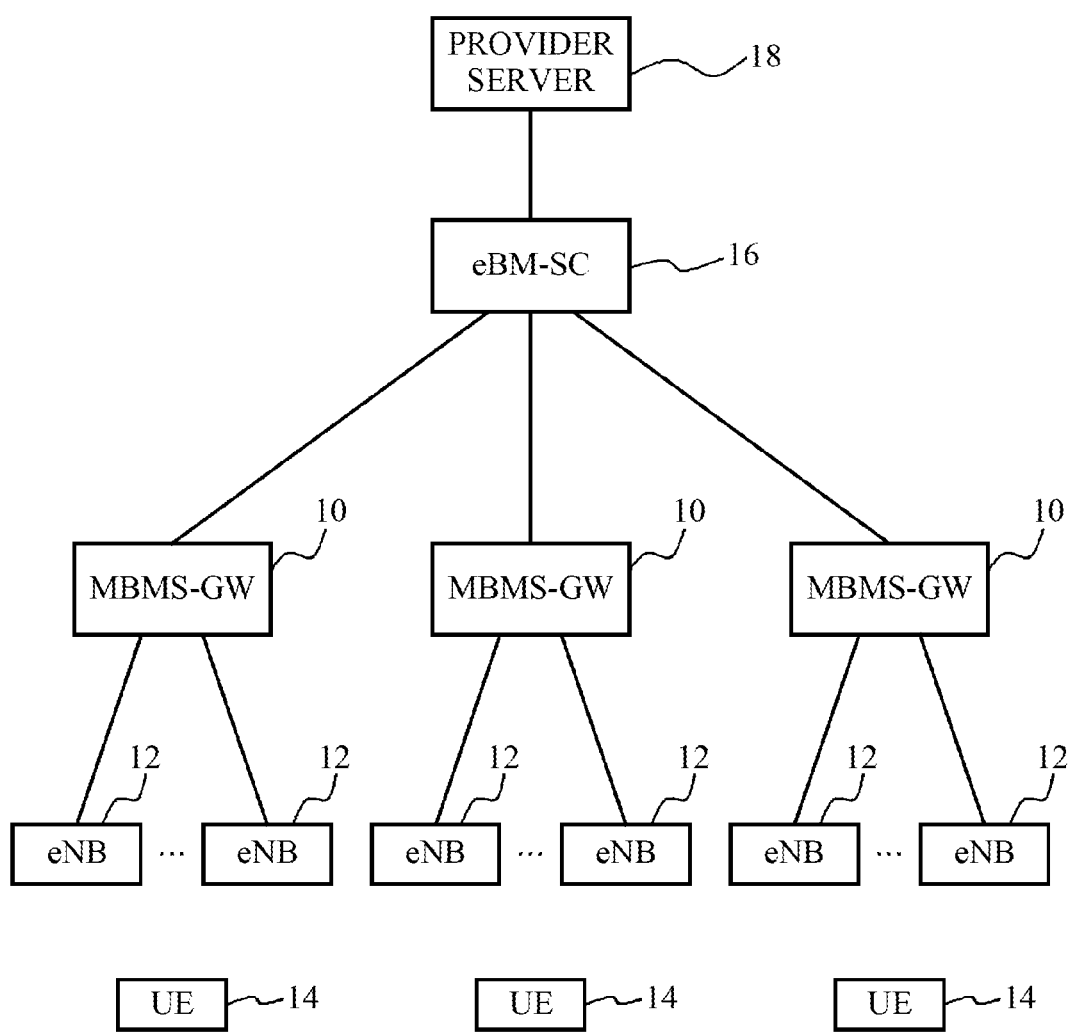
FIG. 1 is a diagram illustrating a communication system performing a MBMS service as an example which applies a communications system of a first embodiment.

FIG. 1 is a diagram illustrating a communication system performing a MBMS service as an example which applies a communications system of a first embodiment. As illustrated in FIG. 1, the communication system includes: an eBM-SC (Evolved Broadcast-Mulicast Service Center) 16 that is an upper control apparatus; MBMS-GWs (MBMS-GateWay) 10 that are a plurality of base station controlling apparatuses; and eNBs (E-UTRAN NodeB) that are a plurality of base stations 12, for example. The eBM-SC 16 is connected to the plurality of MBMS-GWs 10. Each of MBMS-GWs 10 is connected to the plurality of base stations 12 (eNB: E-UTRAN NodeB). The base station 12 can communicate wirelessly with a mobile terminal 14 (UE: User Equipment). The MBMS-GWs 10 and the base stations 12 under the eBM-SC 16 form an IP (Internet Protocol) network. The eBM-SC 16 is connected to a server 18 of a content provider via a network, for example. When IP packet data of an application of the provider server 18 is broadcasted to the mobile terminals 14 in the IP network, the eBM-SC 16 transmits the IP packet data to the plurality of MBMS-GWs 10. Each of the MBMS-GWs 10 transmits the IP packet data to the plurality of subordinate base stations 12. Each of the MBMS-GWs 10 causes the plurality of base stations 12 to synchronously distribute a plurality of packet data to the mobile terminal 14.

Figure 2:
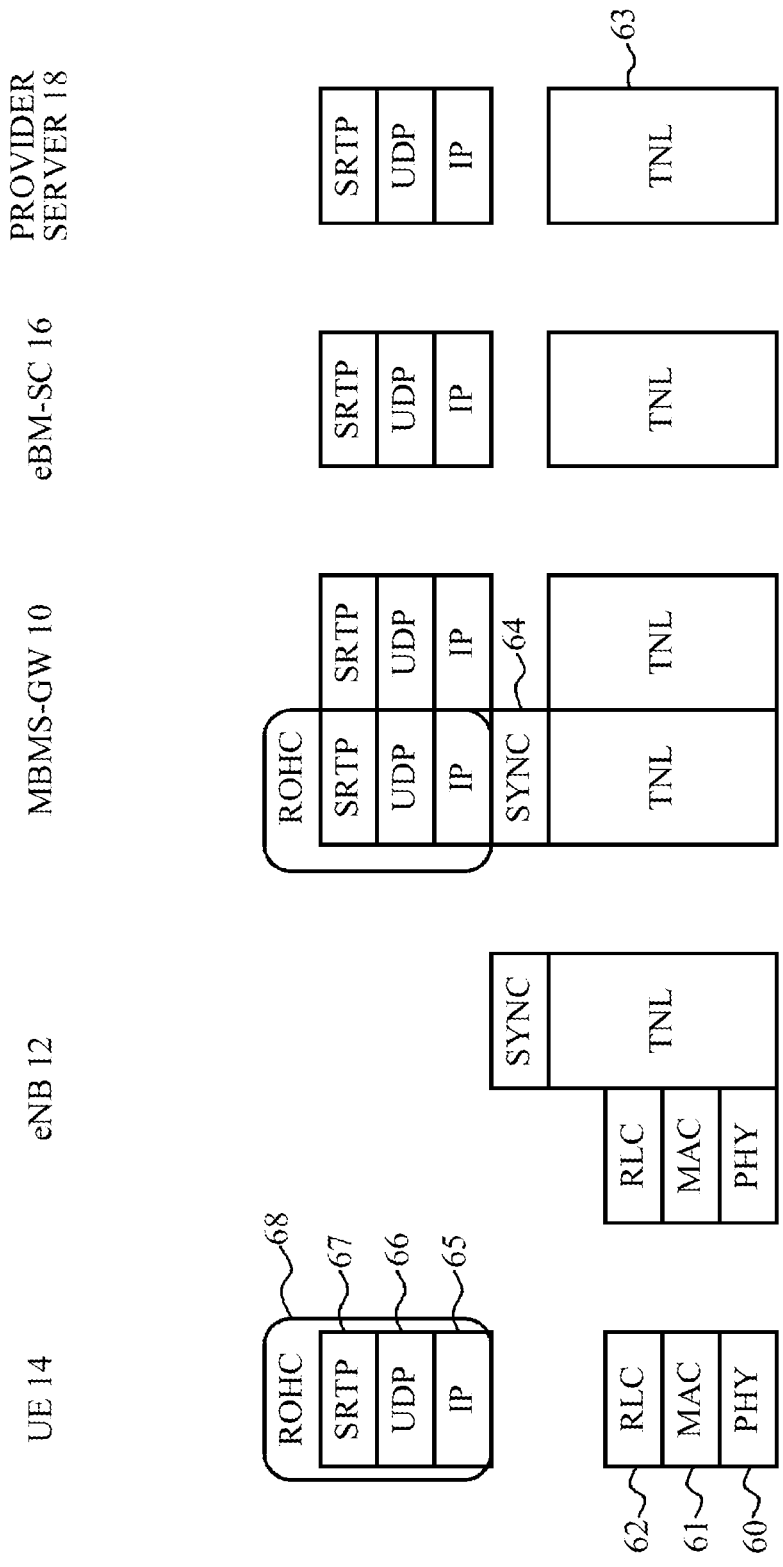
FIG. 2 is a diagram illustrating layers of each device.

FIG. 2 is a diagram illustrating layers of each device. Protocols between the mobile terminal 14 and the base station 12 are a PHY (Physical) layer 60, a MAC (Medium Access Control) layer 61, and a RLC (Radio Link Control) layer 62. A protocol from the provider server 18 to the base station 12 is a TNL (Transport Network Layer) 63. Protocols between the provider server 18 and the mobile terminal 14 are an IP 65, a UDP (User Datagram Protocol) 66, and a SRTP (Secure Real Time Protocol) 67, as upper layers. The IP packet data is data of the application protocol SRTP, for example. The MBMS-GW 10 compresses the packet data of the IP 65, the UDP 66 and the SRTP 67 by using a ROHC (Robust Header Compression) 68, and transmits the compressed data to the mobile terminal 14.

Figure 3A:
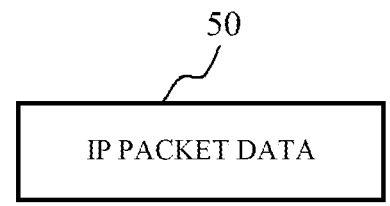
FIGS. 3A and 3B are diagrams illustrating IP packet data.
Figure 3B:
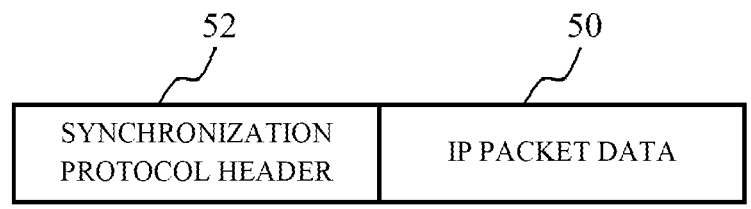

A description will be given of a method in which the base stations 12 simultaneously transmits the IP packet data to the mobile terminal 14. FIGS. 3A and 3B are diagrams illustrating IP packet data 50. As illustrated in FIG. 3A, synchronization information is not added to the IP packet data 50 which the provider server 18 transmits. As illustrated in FIG. 3B, the MBMS-GW 10 adds a synchronization protocol header 52 to the IP packet data 50, and transmits the IP packet data 50 to which the synchronization protocol header 52 is added, to the subordinate base stations 12. The synchronization protocol header 52 is added to each of the plurality of IP packet data 50, and is synchronization information for causing the plurality of base stations 12 to synchronously distribute the plurality of IP packet data 50 to the mobile terminal 14. For example, a time stamp TS is included in the synchronization protocol header 52, and the time stamp TS is added to each IP packet data 50 and indicates time when the base station 12 transmits the IP packet data 50 to the mobile terminal 14. Each of the base stations 12 under the MBMS-GW 10 transmits each IP packet data 50 to the mobile terminal 14, based on each of the plurality of the synchronization information. For example, each of the base stations 12 transmits each IP packet data 50 to the mobile terminal 14 at the time indicated by the time stamp TS. Thereby, the base stations 12 under the MBMS-GW 10 can synchronously transmit the plurality of IP packet data 50 to the mobile terminal 14.

Figure 4A:
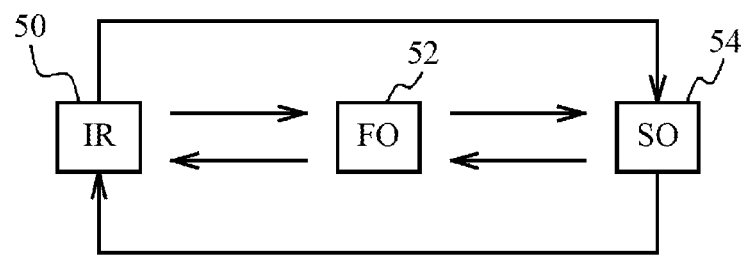
FIG. 4A is a diagram illustrating states of ROHC.

A description will be given of the compression which the MBMS-GW 10 performs, by using an example of the ROHC. The ROHC is a method for differential encoding to a difference between headers of the plurality of IP packet data 50. FIG. 4A is a diagram illustrating states of the ROHC. Three states of IR (Initialization and Refresh), FO (First Order), and SO (Second Order) are defined in the ROHC. The IR is in a state where all the header information is data to be transmitted. That is, the IR is in a state where the compression gain is not made. The FO is in a state where only a dynamic changing portion (i.e., differential data) in the header information becomes data to be transmitted. The dynamic changing portion is a SRTP sequence number of the IP packet data, for example. The SO is in a state where the dynamic changing portion (differential data) is further coded and becomes data to be transmitted. Each state can be switched for each packet.

Figure 4B:
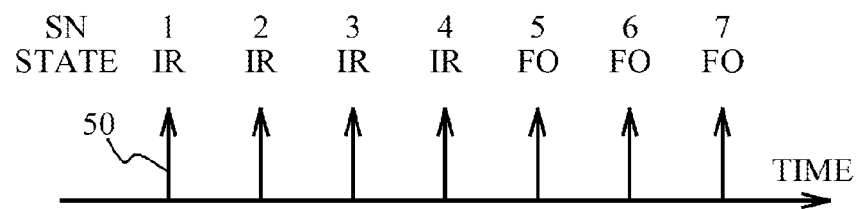
FIG. 4B is a schematic diagram illustrating transition of compression states.

FIG. 4B is a schematic diagram illustrating transition of the compression states. In FIG. 4B, vertical arrows indicate the plurality of IP packet data 50. The plurality of IP packet data 50 in which the sequence numbers (SN) are 1 to 7 are transmitted for a given period. The compression states of the plurality of IP packet data 50 in which the SNs are 1 to 4 are the IR. The compression states of the plurality of IP packet data 50 in which the SNs are 5 to 7 are the FO. Thus, the compression state is switched at timing of the SN "5".

Thus, when the MBMS-GWs 10 perform the data compression, it is required to synchronize the transition of the compression state. A description will be given of an example of a case where the MBMS-GWs 10 synchronize the transition of the compression state.

Figure 5:
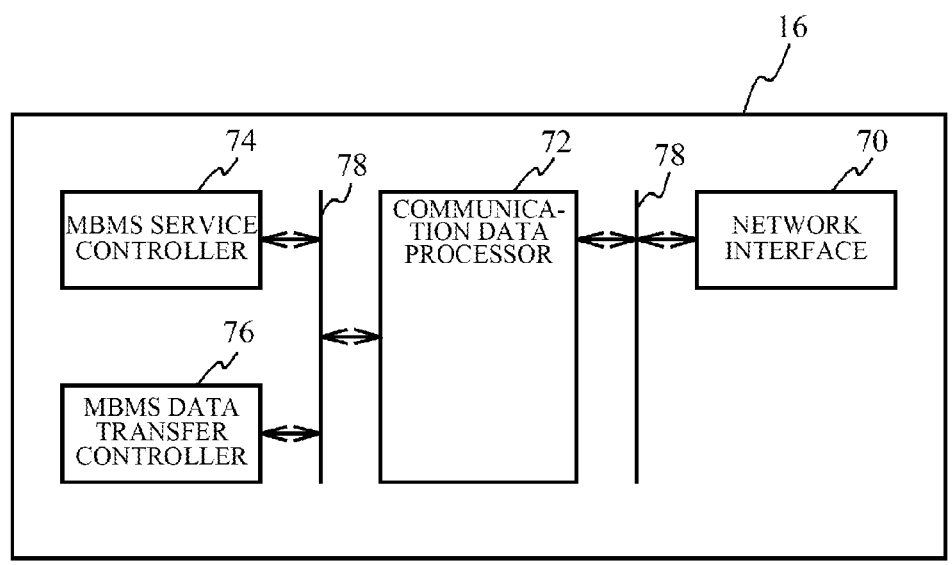
FIG. 5 is a block diagram of an eBM-SC.

FIG. 5 is a block diagram of the eBM-SC 16. The eBM-SC 16 includes a network interface 70, a communication data processor 72, a MBMS service controller 74, and a MBMS data transfer controller 76. The network interface 70 terminates the protocols of FIG. 2, and transmits and receive data between an external and the communication data processor 72 via a bus 78. The communication data processor 72 receives the IP packet data from the provider server 18 or transmits the IP packet data to the MBMS-GW 10, based on setting from the MBMS data transfer controller 76. The communication data processor 72 recognizes signaling information to the eBM-SC 16, such as a MBMS service request from the provider server 18, and transmits and receives data to/from the MBMS service controller 74 that processes the signaling information.

The MBMS service controller 74 receives the MBMS service request from the provider server 18 via the communication data processor 72, and performs the termination of the signaling information for MBMS service establishment, and the management of service information. The MBMS data transfer controller 76 manages a bearer for distributing the IP packet data, based on designation of the MBMS-GW 10 that is a distribution target of the IP packet data from the provider server 18.

Figure 6:
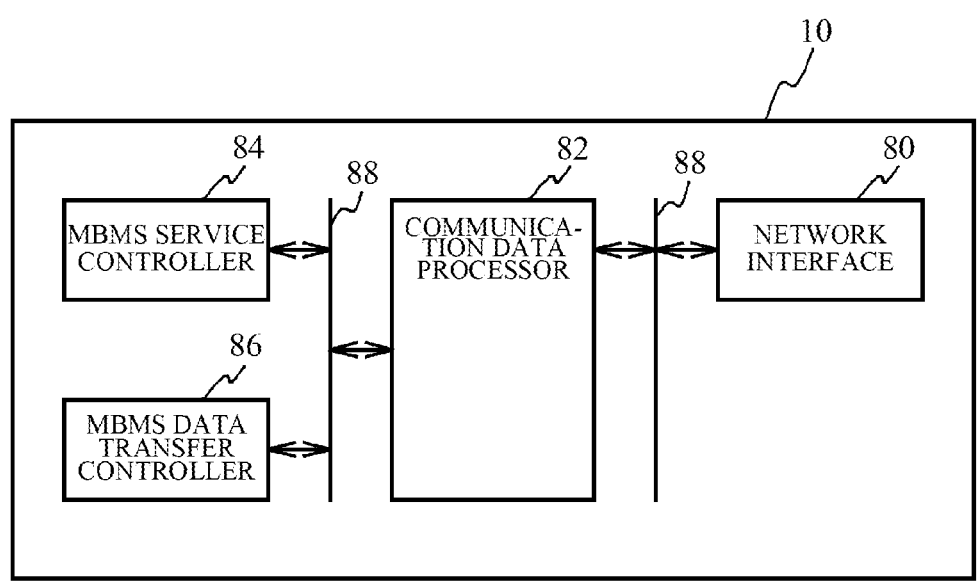
FIG. 6 is a block diagram of a MBMS-GW.

FIG. 6 is a block diagram of the MBMS-GW 10. The MBMS-GW 10 includes a network interface 80, a communication data processor 82, a MBMS service controller 84, and a MBMS data transfer controller 86. The network interface 80 terminates the protocols of FIG. 2, and transmits and receive data between an external and the communication data processor 82 via a bus 88. The communication data processor 82 receives the IP packet data from the eBM-SC 16 or transmits the IP packet data to the base station 12, based on setting from the MBMS data transfer controller 86. The communication data processor 82 recognizes signaling information to the eBM-SC 16, such as a MBMS service request from the eBM-SC 16, and transmits and receives data to/from the MBMS service controller 84 that processes the signaling information.

The MBMS service controller 84 performs the termination of the signaling information for MBMS service establishment, and the management of service information. The MBMS data transfer controller 86 manages a bearer for distributing the IP packet data, based on designation of the base station 12 that is a distribution target of the IP packet data.

Figure 7A:
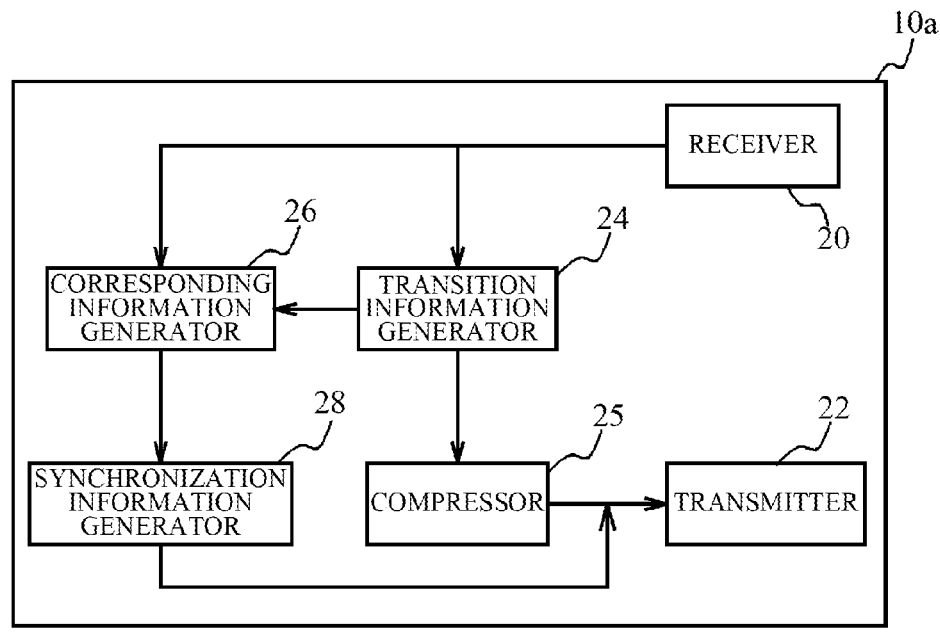
FIGS. 7A and 7B are process block diagrams of the MBMS-GW.
Figure 7B:
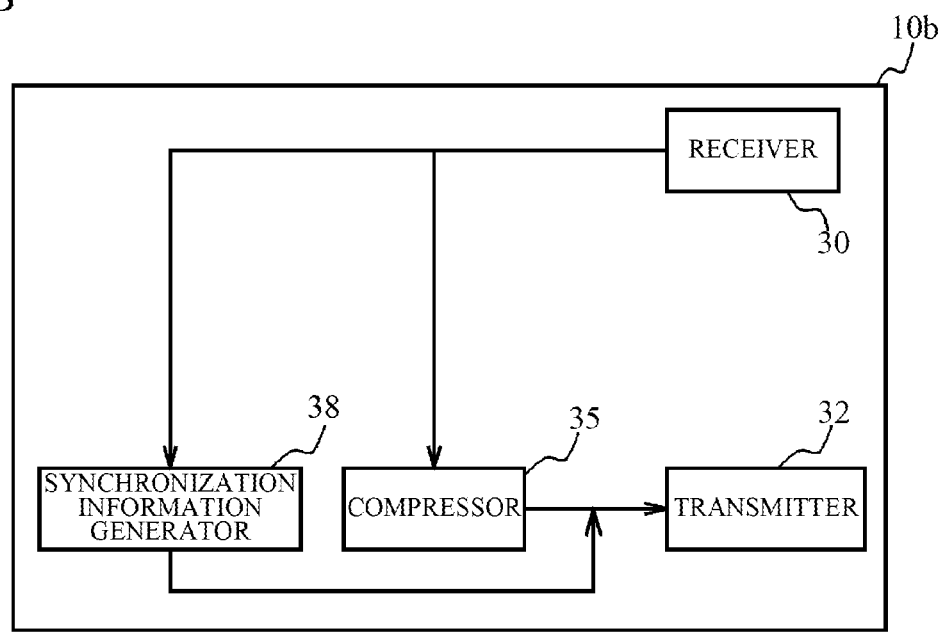

FIGS. 7A and 7B are process block diagrams of the MBMS-GWs 10. FIG. 7A is a block diagram of the MBMS-GW 10a that generates the transition information corresponding to a sequence number of the packet data used for switching the compression state. As illustrated in FIG. 7A, the MBMS-GW 10a includes a receiver 20, a transmitter 22, a transition information generator 24, a compressor 25, a corresponding information generator 26, and a synchronization information generator 28. The network interface 80 of FIG. 6 can be the receiver 20 and the transmitter 22. The communication data processor 82 can be the transition information generator 24 and the compressor 25. The MBMS data transfer controller 86 can be the corresponding information generator 26 and the synchronization information generator 28.

FIG. 7B is a process block diagram of the MBMS-GW 10b receiving the transition information. As illustrated in FIG. 7B, the MBMS-GW 10b includes a receiver 30, a transmitter 32, a compressor 35, and a synchronization information generator 38. The network interface 80 of FIG. 6 can be the receiver 30 and the transmitter 32. The communication data processor 82 can be the compressor 25. The MBMS data transfer controller 86 can be the synchronization information generator 28.

Figure 8:
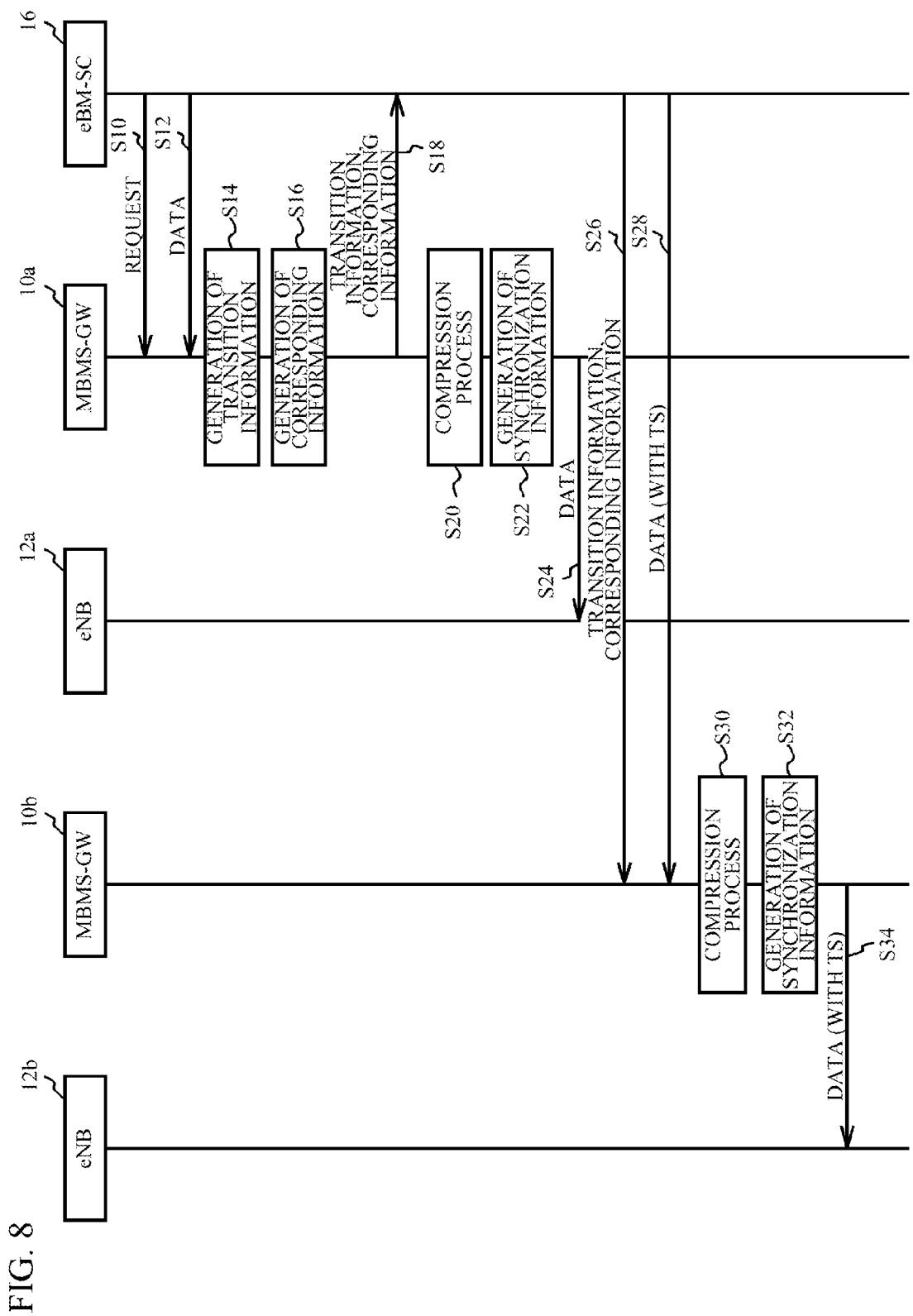
FIG. 8 is a sequence diagram of a communication system.

FIG. 8 is a sequence diagram of the communication system. The eBM-SC 16 requests the MBMS-GW 10a to generate the transition information (step S10). The eBM-SC 16 transmits the plurality of IP packet data 50 of the application protocol such as SRTP to the MBMS-GW 10*a*. The receiver 20 of the MBMS-GW 10*a* receives the plurality of IP packet data 50 (step S12). The transition information generator 24 of the MBMS-GW 10*a* generates the transition information (step S14). The transition information generator 24 establishes a corresponding relationship between the SN of the IP packet data 50 of the application protocol such as SRTP, and the transition of the compression states of the ROHC. For example, in FIG. 4B, the transition from the IR to the FO is perform when the SN is "5". In this case, the transition information includes "a transition SN (SN in which the compression state is switched)=5".

The corresponding information generator 26 of the MBMS-GW 10*a* generates corresponding information (step S16). The corresponding information is information which associates the sequence number SN of the plurality of IP packet data 50 with a reference time when the base stations 12 synchronously distribute the plurality of IP packet data 50 to the mobile terminal 14. The transmitter 22 of the MBMS-GW 10*a* transmits the transition information and the corresponding information to the eBM-SC 16 (step S18). The compressor 25 of the MBMS-GW 10*a* performs a compression process of the IP packet data 50 based on the transition information (step S20). For example, the compressor 25 performs a ROHC process. The synchronization information generator 28 of the MBMS-GW 10*a* generates the synchronization information based on the corresponding information (step S22). For example, the synchronization information generator 28 adds a synchronization protocol header to the IP packet data 50, as illustrated in FIG. 3B. The transmitter 22 of the MBMS-GW 10*a* transmits IP packet data 50 in which the compression process to at least a part thereof (e.g. the header) is performed, and the synchronization information (e.g. the time stamp TS) to the base station 12*a* (step S24).

The eBM-SC 16 transmits the transition information and the corresponding information to the MBMS-GW 10*b*, and the receiver 30 of the MBMS-GW 10*b* receives the transition information and the corresponding information (step S26). The eBM-SC 16 transmits the IP packet data 50 to the MBMS-GW 10*b*, and the receiver 30 of the MBMS-GW 10*b* receives the IP packet data 50 (step S28). The compressor 35 of the MBMS-GW 10*b* compresses the IP packet data 50 based on the transition information (step S30). The synchronization information generator 38 of the MBMS-GW 10*b* generates the synchronization information based on the corresponding information (step S32). The transmitter 32 of the MBMS-GW 10*b* transmits the compress-processed IP packet data 50 and the synchronization information 52 to the base station 12*b* (step S34). The receiver 20 of the MBMS-GW 10*a* also receives the IP packet data 50 in step S28 and performs the same processes as steps S20, S22 and S24, but this is not illustrated in FIG. 8.

FIGS. 9A to 9C are diagrams illustrating relationship between the corresponding information and the synchronization information. FIG. 9A illustrates transmission timings of the plurality of IP packet data from the eBM-SC 16 to the MBMS-GWs 10*a* and 10*b*. The SN indicates the sequence number of the IP packet data. FIGS. 9B and 9C illustrate transmission timings of the plurality of IP packet data from the base stations 12*a* and 12*b* to the mobile terminal 14, respectively. As illustrated in FIG. 9A, the plurality of IP packet data in which the SNs are X to X+2 are transmitted from the eBM-SC 16 to the MBMS-GWs 10*a* and 10*b* at a period Ti. When the plurality of the IP packet data 50 are data on a voice and a video, the interval between the plurality of the IP packet data 50 may spread. In such a case, when the interval is beyond a base period Tc, the transmission timings of the plurality of IP packet data are reset on the basis of at. In an example of FIG. 9A, after the IP packet data 50 in which the SN is X+2 is transmitted and an interval "Ti+δt" elapses, the IP packet data 50 in which the SN is X+3 is transmitted.

As illustrated in FIG. 9B, the corresponding information generator 26 of the MBMS-GW 10*a* decides a reference time TS0 corresponding to the sequence number SN=X. The corresponding information includes the sequence number SN=X and the reference time TS0. The reference time TS0 can be time in which the MBMS-GW 10*a* receives the IP packet data 50 corresponding to the SN "X", or time different from this time. The corresponding information generator 26 decides a time difference Δt beforehand in consideration of data transfer time for synchronously distributing the plurality of IP packet data from the MBMS-GW 10*a* to all the base stations 12*a* and 12*b*. For example, the corresponding information generator 26 decides the time difference Δt beforehand so that all the base stations 12*a* and 12*b* can distribute the IP packet data 50 corresponding to the SN "X" at a time TS0+Δt. For example, the corresponding information generator 26 decides the time difference Δt in view of the MBMS-GW which takes the longest data transfer time.

The synchronization information generator 28 of the MBMS-GW 10*a* calculates the time stamp TS (SN) based on the reference time TS0 which the corresponding information generator 26 generates, and the sequence number SN=X corresponding to the reference time TS0. For example, the synchronization information generator 28 calculates the time stamp TS (SN) according a formula (1), with respect to the plurality of IP packet data 50 corresponding to the SNs "X" to "X+2". The synchronization information generator 28 calculates the time stamp TS (SN) according a formula (2), with respect to the plurality of IP packet data 50 corresponding to the SN "X+3" and SNs subsequent to "X+3".

$$TS(SN)=TS0+\Delta t+Ti^*(SN-(X-N)) \quad (1)$$

Where N is 0 to 2.

$$TS(SN)=TS(X+2)+\Delta t+\delta t+Ti^*(SN-(X+2)) \quad (2)$$

Each of the MBMS-GWs 10*a* and 10*b* holds a value of time difference Δt, and the synchronization information generator 28 can acquire the time difference Δt on a timely basis. Alternatively, the synchronization information generator 28 can acquire the time difference Δt from the eBM-SC 16. Since the period Ti is characteristic information about a packet data flow decided by the broadcast service which the provider server 18 provides, the eBM-SC 16 can recognizes the period Ti. Therefore, the synchronization information generator 28 can acquire the time difference Δt from the eBM-SC 16. Alternatively, the synchronization information generator 28 can comprehend the time difference Δt from the compression control of the compressor 25. The Tc and the δt are the common parameters of the MBMS-GWs, and the synchronization information generator 28 can acquire the Tc and the δt from the eBM-SC 16, for example. Therefore, if the synchronization information generator 28 can acquire the reference time TS0 and the corresponding sequence number SN=X, the synchronization information generator 28 can calculate the time stamp TS (SN) corresponding to each IP packet data 50 according to the formula (1) or (2). It should be noted that the SN=X corresponding to the reference time TS0 and the transition SN of the transition information can be common Thereby, the transition SN included in compression information can be used as the SN corresponding to the reference time TS0. Therefore, the corresponding information can be only the reference time TS0 without including the SN=X corresponding to the reference time TS0.

The synchronization information generator 28 adds the synchronization information (e.g. the synchronization protocol header 52) including the time stamp TS (SN) to each IP packet data 50, as illustrated in FIG. 3B. Thereby, the base station 12a can distribute each IP packet data 50 at designated time, as illustrated in FIG. 9B.

The synchronization information generator 38 of the MBMS-GW 10b generates the synchronization information of each IP packet data 50, based on the reference time TS0 in the corresponding information received from the MBMS-GW 10a, with the use of the formulas (1) and (2). Therefore, the base station 12b can distribute each IP packet data 50 at the same designated time as the base station 12, as illustrated in FIG. 9C.

Figure 10:
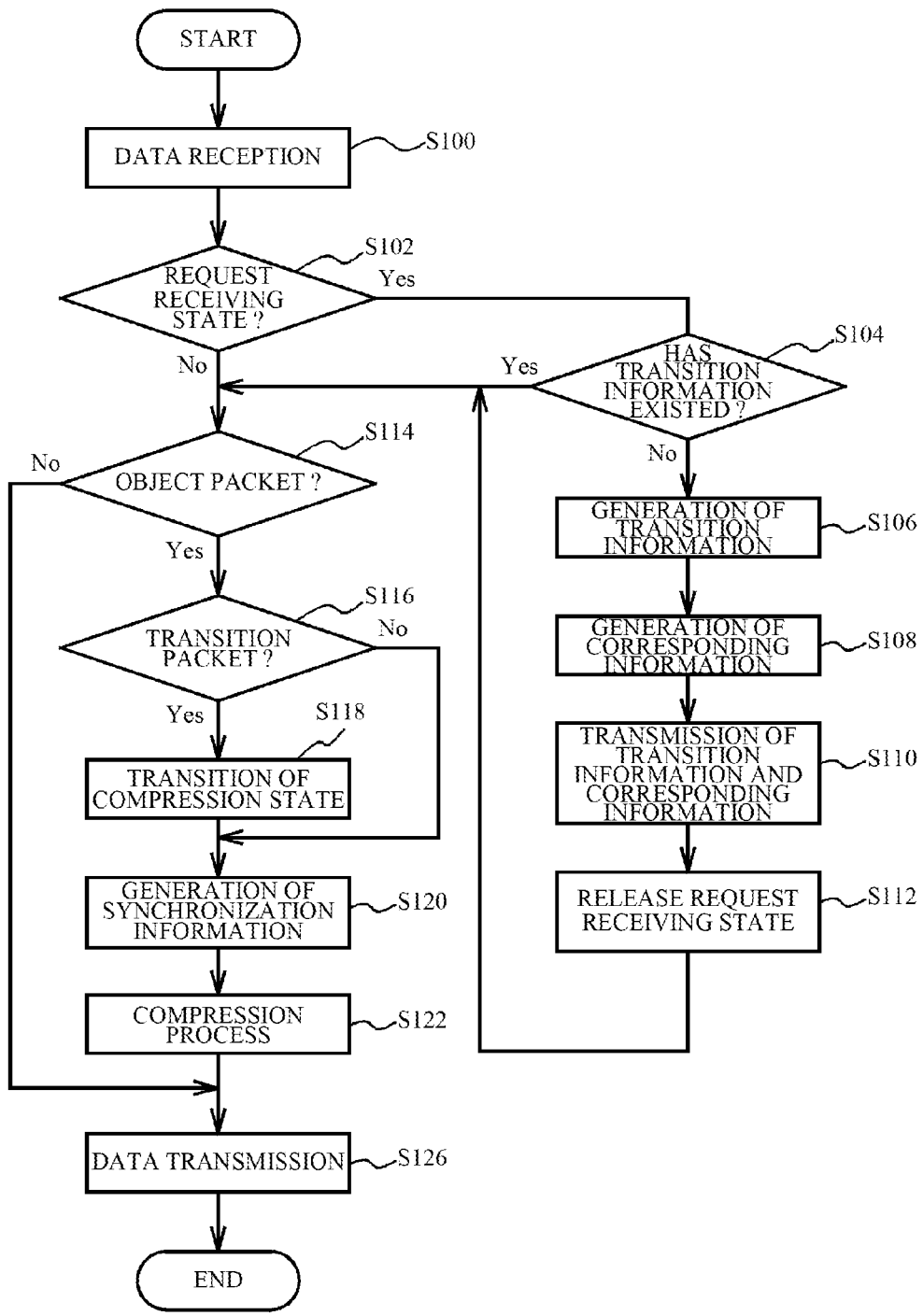
FIG. 10 is a flowchart illustrating processes of the MBMS-GW.

FIG. 10 is a flowchart illustrating processes of the MBMS-GWs 10a and 10b. The receiver 20 or 30 receives the plurality of IP packet data 50 from the eBM-SC 16 (step S100). This step corresponds to step S12 of FIG. 8. Next, the communication data processor 72 or 82 judges whether the MBMS-GW is in a state of receiving a generation request of the transition information (step S102). When the MBMS-GW receives the generation request of the transition information from the eBM-SC 16 in step S10 of FIG. 8, the judgment of step S102 is YES. When the judgment of step S102 is YES, the communication data processor 72 or 82 judges whether the transition information and the corresponding information have already existed (step S104). When the judgment of step S104 is NO, the transition information generator 24 generates the transition information (step S106). This step corresponds to step S14 of FIG. 8. The corresponding information generator 26 generates the corresponding information (step S108). This step corresponds to step S16 of FIG. 8. The transmitter 22 transmits the transition information and the corresponding information to the other MBMS-GW 10b via the eBM-SC 16 (step S110). This step corresponds to step S18 of FIG. 8. The communication data processor 82 releases the state of receiving the generation request of the transition information (step S112). Then, the procedure proceeds to step S114.

When the judgment of step S102 is NO or the judgment of step S104 is YES, the procedure proceeds to step S114. That is, when the MBMS-GW 10a has already generates the transition information and the generation information or the MBMS-GW 10b has received the transition information and the generation information, the procedure proceeds to step S114.

The compressor 25 or 35 judges whether the IP packet data is a packet to be compressed (step S114). When the judgment of step S114 is NO, the procedure proceeds to step S126. When the judgment of step S114 is YES, the compressor 25 or 35 judges whether the IP packet data is a packet for switching the compression state, based on the transition information (step S116). When the judgment of step S116 is NO, the procedure proceeds to step S120. When the judgment of step S116 is YES, the compressor 25 or 35 switches the compression state (step S118). Next, the synchronization information generator 28 or 38 generates the synchronization information based on the corresponding information (step S120). This step corresponds to step S22 or S32 of FIG. 8. Next, the compressor 25 or 35 performs the compression process of the packet (step S122). This step corresponds to step S20 or S30 of FIG. 8. Although order of steps S120 and S122 is different from that of FIG. 8, the execution order of the compression process and the generation of the synchronous information can be reversible. Finally, the transmitter 22 or 32 transmits the compressed IP packet data and the synchronous information to the base stations 12a and 12b (step S126). This step corresponds to step S24 or S34 of FIG. 8. The above-mentioned processes are performed whenever the IP packet is received from the eBM-SC 16.

According to the first embodiment, the transition information generator 24 of the MBMS-GW 10a, which is a first base station controlling apparatus for example, generates the transition information, as illustrated in step S14 of FIG. 8. The transmitter 22 transmits the transition information to the MBMS-GW 10b via the eBM-SC 16, as illustrated in steps S18 and S26. The compressor 25 compresses the input IP packet data based on the transition information, as illustrated in steps S20. On the other hand, the receiver 30 of the MBMS-GW 10b, which is a second base station controlling apparatus for example, receives the transition information from the MBMS-GW 10a via the eBM-SC 16, as illustrated in step S26. The compressor 35 compresses the input IP packet data based on the received transition information, as illustrated in steps S30.

As described above, the transition information corresponding to the sequence number of the packet data used for switching the compression state is generated by the MBMS-GW 10a and transmitted to the MBMS-GW 10b, and hence MBMS-GW 10a and MBMS-GW 10b receive the same IP packet from eBM-SC 16 and can compress it in the same way. Therefore, the identity of the plurality of compressed IP packet data to be transmitted to the mobile terminal 14 can be guaranteed. Although the ROHC compressing a packet header portion is explained as an example of a compression method in the first embodiment, the compressor 25 or 35 may compress at least a part of the packet data. In addition, the transmission of the transition information from the MBMS-GW 10a to the MBMS-GW 10b can be performed via the eBM-SC 16 or directly.

According to the first embodiment, the corresponding information generator 26 of the MBMS-GW 10a generates the corresponding information, as illustrated in step S16 of FIG. 8. The transmitter 22 transmits the corresponding information to the MBMS-GW 10b via the eBM-SC 16, as illustrated in steps S18 and S26. The synchronization information generator 28 generates the synchronization information corresponding to each of the plurality of input IP packet data, based on the corresponding information, as illustrated in steps S22. On the other hand, the receiver 30 of the MBMS-GW 10b receives the corresponding information from the MBMS-GW 10a via the eBM-SC 16, as illustrated in step S26. The synchronization information generator 28 generates the synchronization information corresponding to each of the plurality of packet data, based on the corresponding information, as illustrated in steps S32.

As described above, the MBMS-GW 10a generates the corresponding information which associates the sequence number SN=X of the plurality of IP packet data with the reference time when the base stations 12a and 12b synchronously distribute the plurality of IP packet data to the mobile terminal 14. Then, the MBMS-GW 10a transmits the corresponding information to the MBMS-GW 10b. Thereby, the MBMS-GW 10a and the MBMS-GW 10b can generate the same synchronization information to the packet data of the same sequence number.

Moreover, the sequence number SN=X corresponding to the reference time TS0 of the corresponding information can be the sequence number (transition SN) of the packet data used for switching the compression state in the transition information. Thereby, the corresponding information can be simplified.

Embodiment 2

Figure 11:
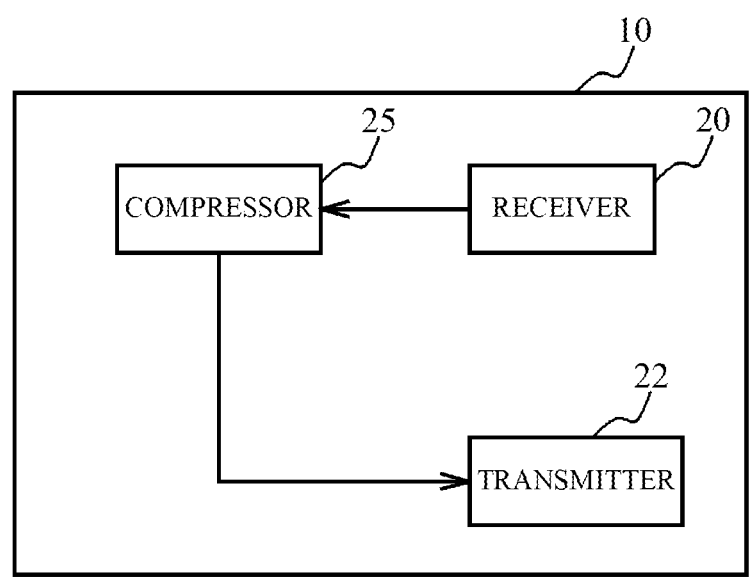
FIG. 11 is a process block diagram of the MBMS-GW of the second embodiment.

A second embodiment illustrates an example in which the eBM-SC 16 distributes and generates the transition information. FIG. 11 is a process block diagram of the MBMS-GW 10 of the second embodiment. As illustrated in FIG. 11, the MBMS-GW 10 includes the receiver 20, the compressor 25 and the transmitter 22.

Figure 12:
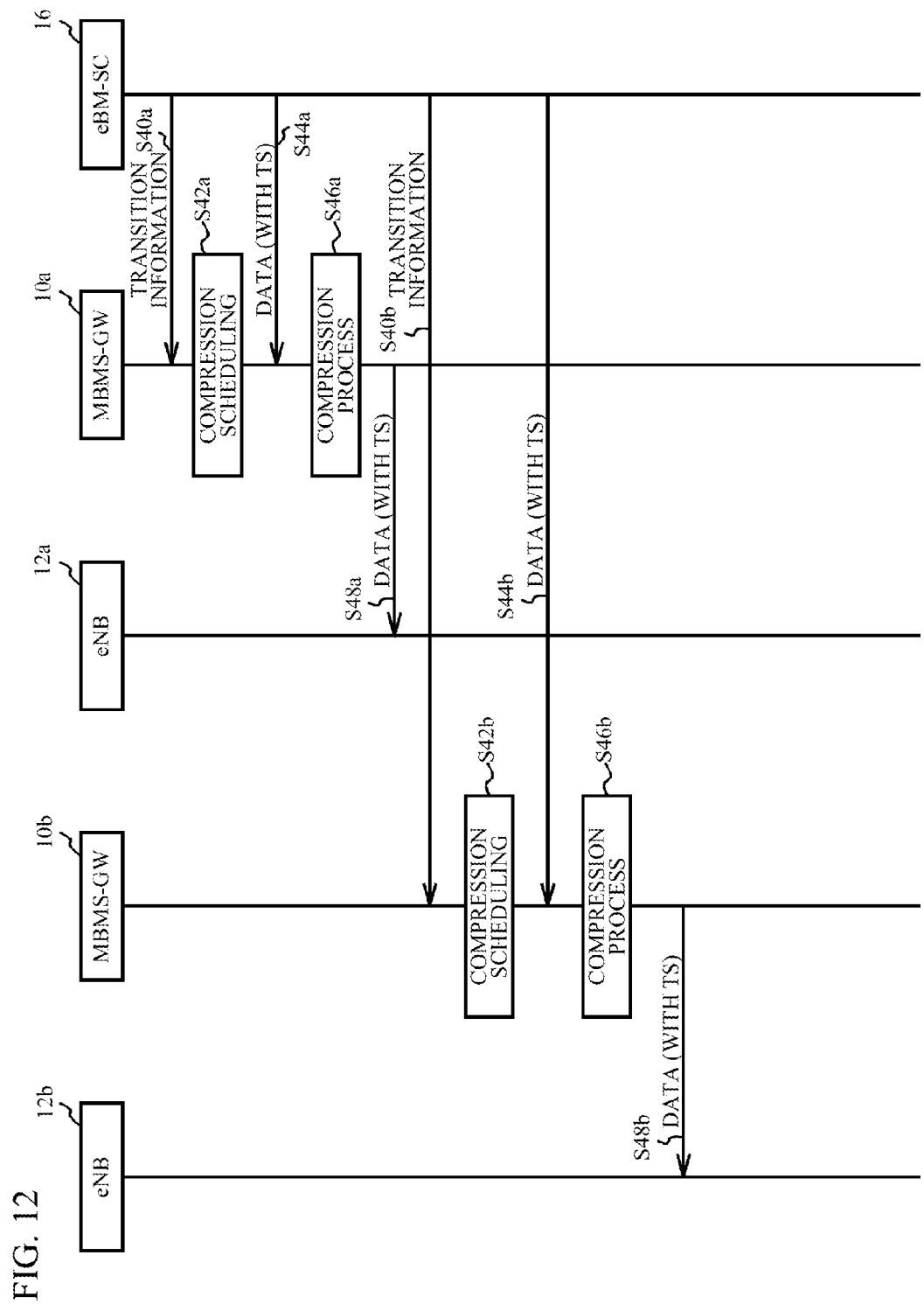
FIG. 12 is a sequence diagram of the communication system of the second embodiment.

FIG. 12 is a sequence diagram of the communication system of the second embodiment. As illustrated in FIG. 12, the eBM-SC 16 transmits the transition information to the MBMS-GW 10*a*. The receiver 20 of the MBMS-GW 10*a* receives the transition information (step S40*a*). The compressor 25 of the MBMS-GW 10*a* makes a schedule for compression based on the transition information (step S42*a*). The eBM-SC 16 transmits the IP packet data and the synchronization information to the MBMS-GW 10*a*. The receiver 20 of the MBMS-GW 10*a* receives the IP packet data and the synchronization information (step S44*a*). The compressor 25 compresses the IP packet data (step S46*a*). For example, the ROHC is performed. The transmitter 22 of the MBMS-GW 10*a* transmits the compressed IP packet data and the synchronization information to the base station 12*a* (step S48*a*). The receiver 20 of the MBMS-GW 10*a* also receives the IP packet data 50 in step S44*b* and performs the same processes as steps S46*a* and S48*a*, but this is not illustrated in FIG. 12. The above-mentioned processes are performed whenever the IP packet is received from the eBM-SC 16.

The eBM-SC 16, the MBMS-GW 10*b* and the base station 12*b* perform steps S40*b* to S48*b* as in the case where the eBM-SC 16, the MBMS-GW 10*a* and the base station 12*a* perform steps S40*a* to S48*a*.

Figure 13:
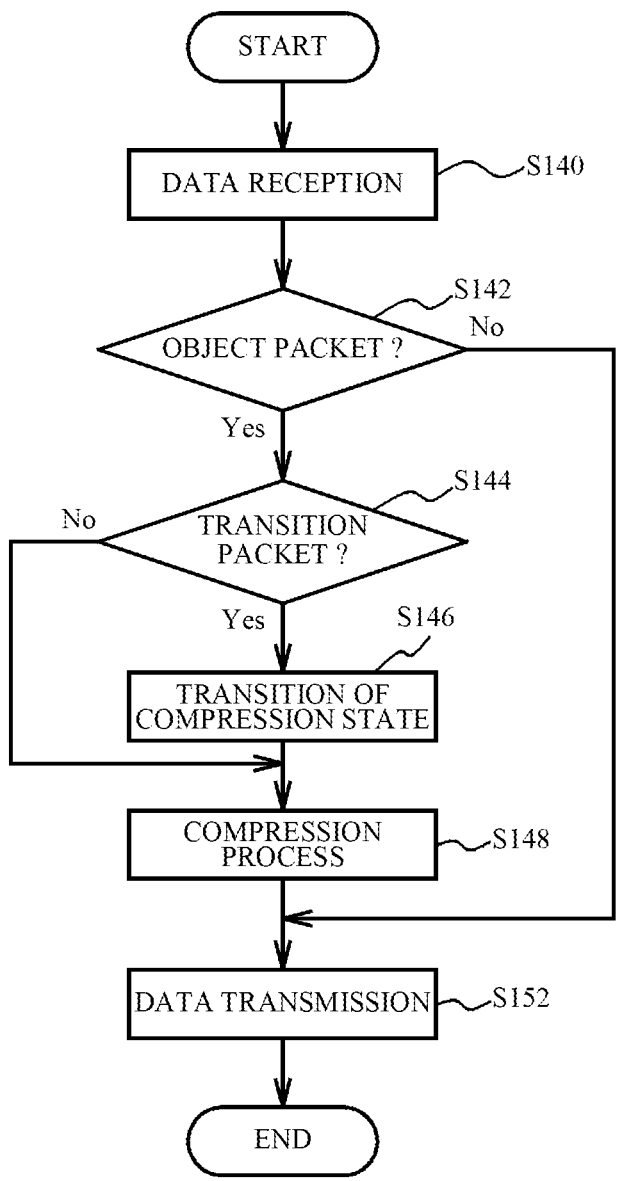
FIG. 13 is a flowchart illustrating processes of the MBMS-GW of the second embodiment.

FIG. 13 is a flowchart illustrating processes of the MBMS-GWs 10*a* and 10*b*. The receiver 20 receives the IP packet data 50 along with the synchronization information from the eBM-SC 16 (step S140). This step corresponds to steps 40*a* and 40*b* of FIG. 12. Next, the compressor 25 judges whether the IP packet data is a packet to be compressed (step S142). When the judgment of step S142 is NO, the procedure proceeds to step S152. When the judgment of step S142 is YES, the compressor 25 judges whether the IP packet data is a packet for switching the compression state, based on the transition information (step S144). When the judgment of step S144 is NO, the procedure proceeds to step S148. When the judgment of step S144 is YES, the compressor 25 switches the compression state (step S146). In step S148, the compressor 25 performs the compression process of the packet data (step S148). Finally, the transmitter 22 transmits the compressed IP packet data along with the synchronization information to the base stations 12*a* and 12*b* (step S152). This step corresponds to steps S48*a* and S48*b* of FIG. 12.

According to the second embodiment, the receiver 20 of each of the MBMS-GWs 10*a* and 10*b* (base station controlling apparatus) receives the transition information from the eBM-SC 16 (upper control apparatus), as illustrated in steps S40*a* and S40*b* of FIG. 12. Each compressor 25 compresses the plurality of packet data based on the transition information, as illustrated in steps S46*a* and S46*b*. Each transmitter 22 transmits the plurality of compressed packet data along with the synchronization information to the base stations 12*a* and 12*b*, as illustrated in steps S48*a* and S48*b*. Thereby, since each compressor 25 of the MBMS-GWs 10*a* and 10*b* compresses the IP packet data with the same transition information, the identity of the plurality of compressed IP packet data which the base stations 12*a* and 12*b* receive can be guaranteed.

Moreover, the transmitter 22 transmits the synchronization information which the receiver 20 receives from the eBM-SC 16, to the base stations 12*a* and 12*b*. Thereby, the IP packet data to which the same synchronization information is added can be transmitted to the base stations 12*a* and 12*b*.

Embodiment 3

Figure 14:
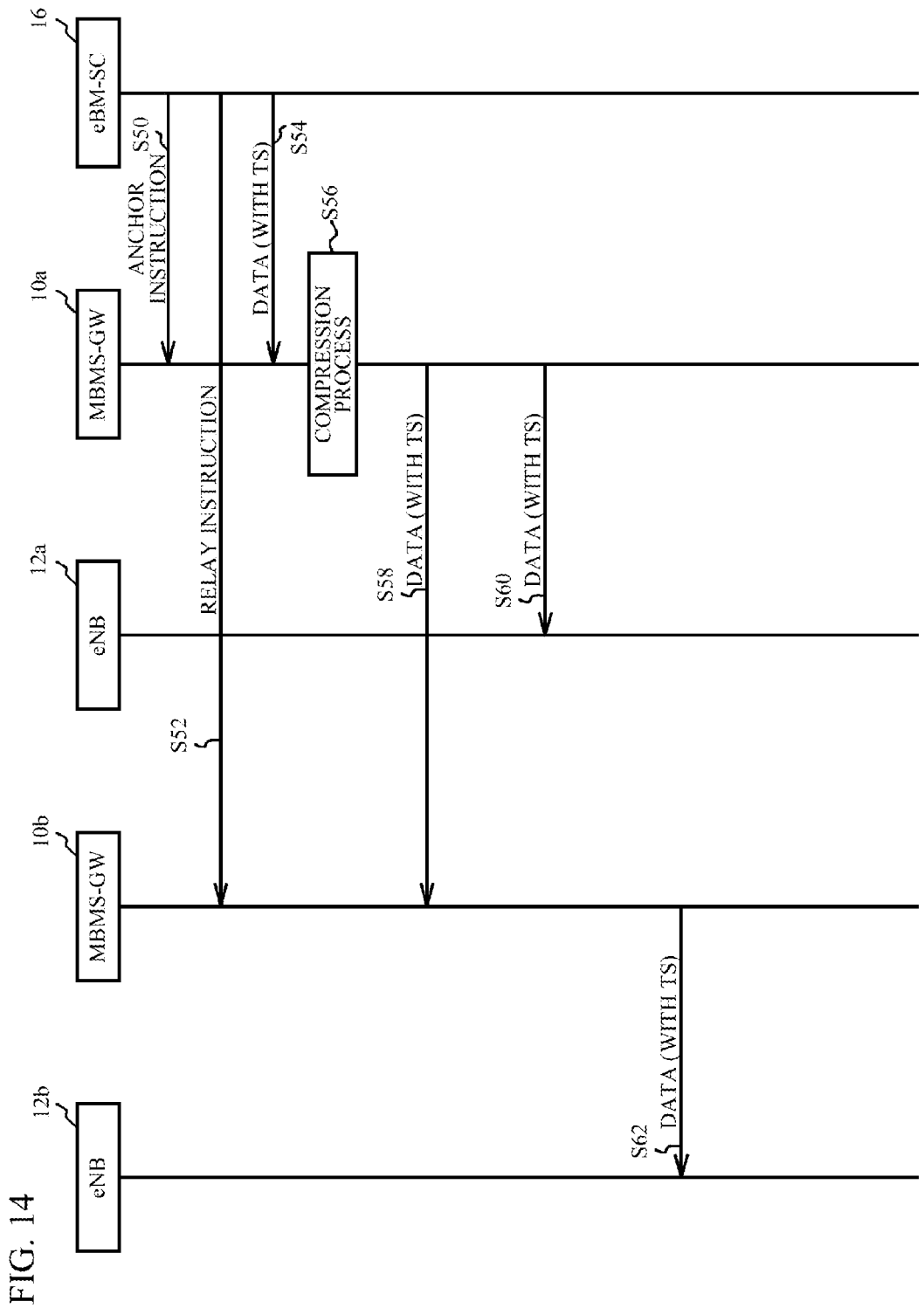
FIG. 14 is a sequence diagram of the communication system of a third embodiment.

A third embodiment illustrates an example in which the MBMS-GW 10*a* performs the compression process of the IP packet data and transmits the compressed IP packet data to another MBMS-GW 10*b*. Since the process blocks of the MBMS-GWs 10*a* and 10*b* of the third embodiment are the same as those of FIG. 11 of the second embodiment, a description thereof is omitted. FIG. 14 is a sequence diagram of the communication system of the third embodiment. As illustrated in FIG. 14, the eBM-SC 16 gives an instruction of an anchor to the MBMS-GW 10*a* (step S50). The eBM-SC 16 gives an instruction of a relay to the MBMS-GW 10*b* (step S52). The eBM-SC 16 transmits the IP packet data to which the synchronization information is added, to the MBMS-GW 10*a*. The receiver 20 of the MBMS-GW 10*a* receives the IP packet data to which the synchronization information is added (step S54). The compressor 25 of the MBMS-GW 10*a* performs the compression process of the IP packet data 50 (step S56). The transmitter 22 of the MBMS-GW 10*a* transmits the compressed IP packet data and the synchronization information to another MBMS-GW 10*b*. The receiver 20 of the MBMS-GW 10*b* receives the compressed IP packet data and the synchronization information (step S58). The transmitter 22 of the MBMS-GW 10*a* transmits the compressed IP packet data and the synchronization information to the base station 12*a* (step S60). The transmitter 22 of the MBMS-GW 10*b* transmits the compressed IP packet data and the synchronization information to the base station 12*b* (step S62).

Figure 15:
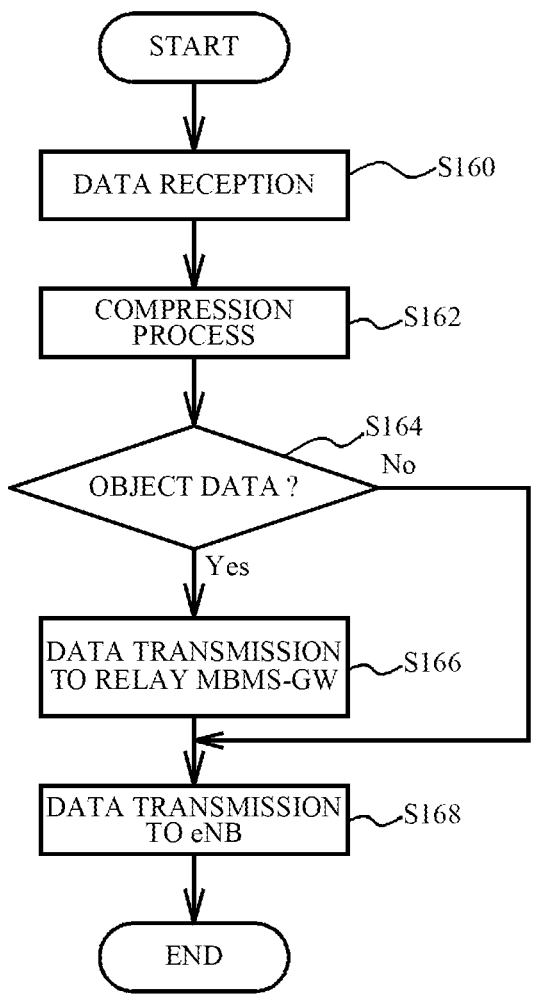
FIG. 15 is a flowchart illustrating processes of a MBMS-GW 10a of the third embodiment.

FIG. 15 is a flowchart illustrating processes of the MBMS-GW 10*a*. The receiver 20 receives the IP packet data along with the synchronization information from the eBM-SC 16. This step corresponds to step S54 of FIG. 14. The compressor 25 performs the compression process of the IP packet data (step S162). This step corresponds to step S56 of FIG. 14. The transmitter 22 judges whether the IP packet data is packet data for the anchor (step S164). When the judgment of step S164 is NO, the procedure proceeds to step S168. When the judgment of step S164 is YES, the transmitter 22 transmits the compressed IP packet data and the synchronization information to another MBMS-GW 10*b* (step S166). This step corresponds to step S58 of FIG. 14. The transmitter 22 of the MBMS-GW 10*a* transmits the compressed IP packet data and the synchronization information to the base station 12*a* (step S168). This step corresponds to step S60 of FIG. 14.

Figure 16:
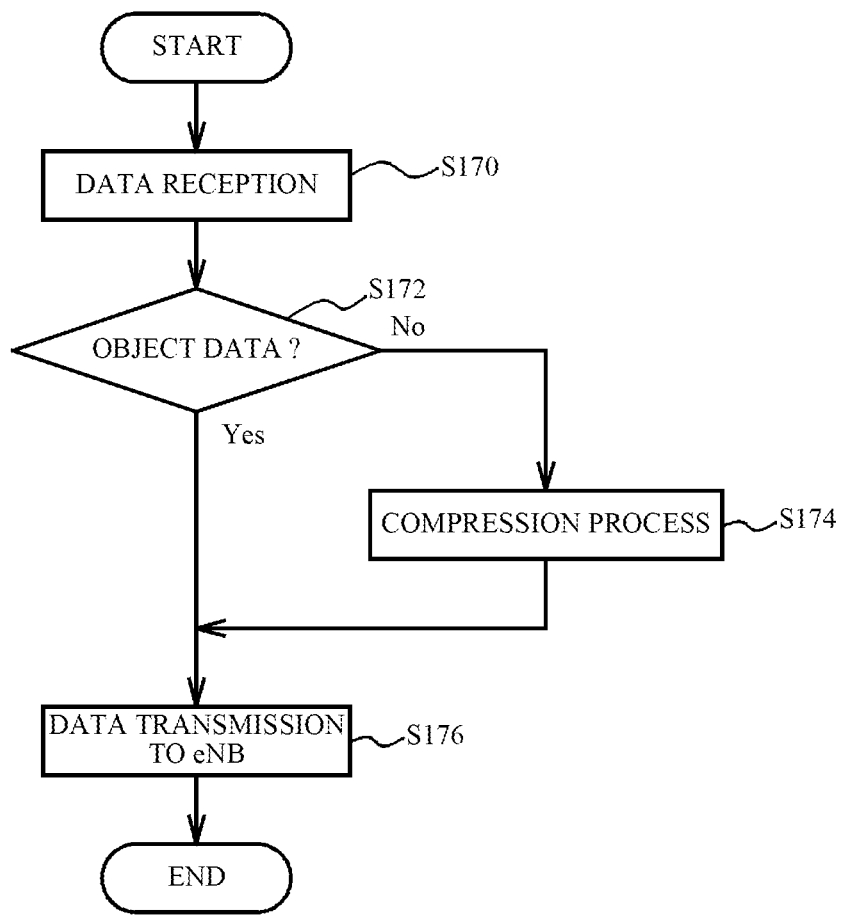
FIG. 16 is a flowchart illustrating processes of a MBMS-GW 10b of the third embodiment.

FIG. 16 is a flowchart illustrating processes of the MBMS-GW 10*b*. The receiver 20 receives the IP packet data 50 along with the synchronization information from the MBMS-GW 10*a* (step S170). This step corresponds to step S58 of FIG. 14. The compressor 25 judges whether the packet data is packet data for the relay (step S172). When the judgment of step S172 is NO, the compressor 25 performs the compression process of the input IP packet data (step S174). Then, the procedure proceeds to step S176. When the judgment of step S172 is YES, the compressor 25 does not perform the compression process of the IP packet data. In step S176, the transmitter 22 transmits the compressed IP packet data and the synchronization information to the base station 12*b* (step S176). This step corresponds to step S62 of FIG. 14.

According to the third embodiment, the transmitter 22 of the MBMS-GW 10*a*, which is the first base station controlling apparatus for example, transmits the IP packet data compressed by the MBMS-GW 10*a* to another MBMS-GW 10*b*, as illustrated in step S58 of FIG. 14. On the other hand, the receiver 20 of the MBMS-GW 10*b*, which is the second base station controlling apparatus for example, receives the IP packet data compressed by the MBMS-GW 10*a*. The transmitter 22 of the MBMS-GW 10*b* transmits the IP packet data compressed by the MBMS-GW 10*a* to the base station 12*b*, as illustrated in step S62. Thus, the packet data compressed by the MBMS-GW 10*a* is transmitted to the MBMS-GW 10*b*, and hence the MBMS-GW 10*b* does not compress the packet data. Thereby, the identity of the plurality of compressed IP packet data which the base stations 12*a* and 12*b* receive can be guaranteed.

In addition, it is not necessary to transmit and receive the transition information as described in the first and the second embodiments.

The receiver 20 of the MBMS-GW 10*a* receives the IP packet data and the synchronization information from the eBM-SC 16, as illustrated in step S54 of FIG. 14. The transmitter 22 of the MBMS-GW 10*a* transmits the compressed IP packet data and the synchronization information to the MBMS-GW 10*b*, as illustrated in step S58. On the other hand, the receiver 20 of the MBMS-GW 10*b* receives the IP packet data compressed by the MBMS-GW 10*a* and the synchronization information. The transmitter 22 of the MBMS-GW 10*b* transmits the compressed IP packet data and the synchronization information to the base station 12*b*, as illustrated in step S62. Thus, the MBMS-GW 10*a* receives the synchronization information along with the IP packet data, and transmits them to the MBMS-GW 10*b*. The MBMS-GW 10*b* directly transmits the synchronization information to the base station 12*b*. Thereby, the plurality of IP packet data to which the same synchronization information is added can be transmitted to the base stations 12*a* and 12*b*.

Embodiment 4

Figure 17:
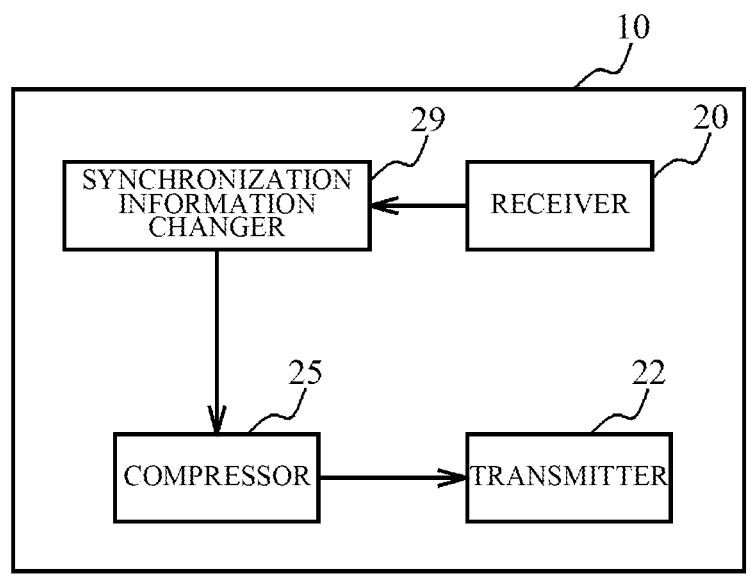
FIG. 17 is a process block diagram of the MBMS-GW 10a of the fourth embodiment.
Figure 18:
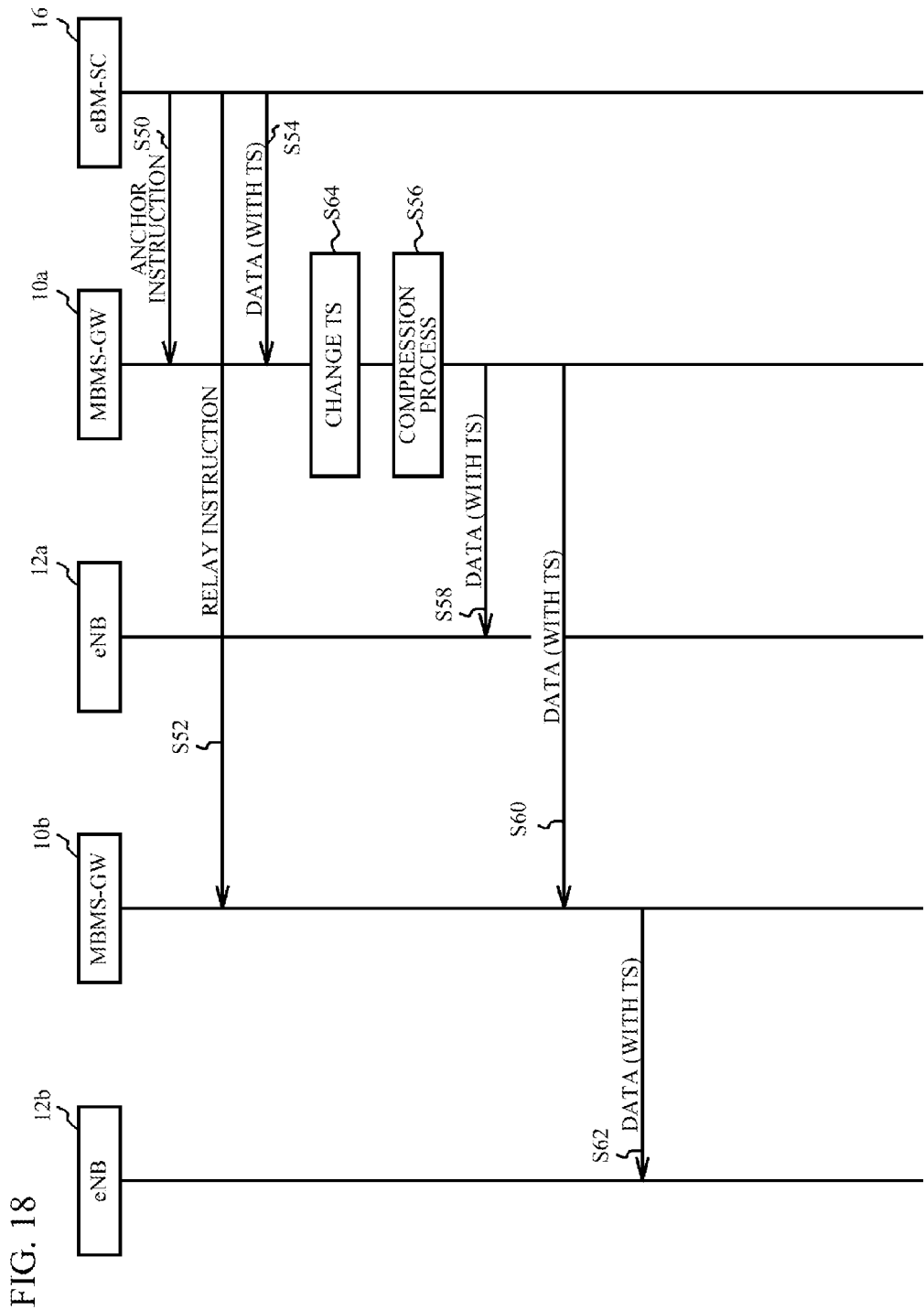
FIG. 18 is a sequence diagram of the communication system of a fourth embodiment.

A fourth embodiment illustrates an example in which the MBMS-GW 10*a* changes the synchronization information. FIG. 17 is a process block diagram of the MBMS-GW 10*a* of the fourth embodiment. A synchronization information changer 29 is provided in addition to FIG. 11. FIG. 18 is a sequence diagram of the communication system of the fourth embodiment. As illustrated in FIG. 18, the MBMS-GW 10*a* changes the synchronization information (step S64). Since the other steps are the same as FIG. 14, a description thereof is omitted.

Figure 19:
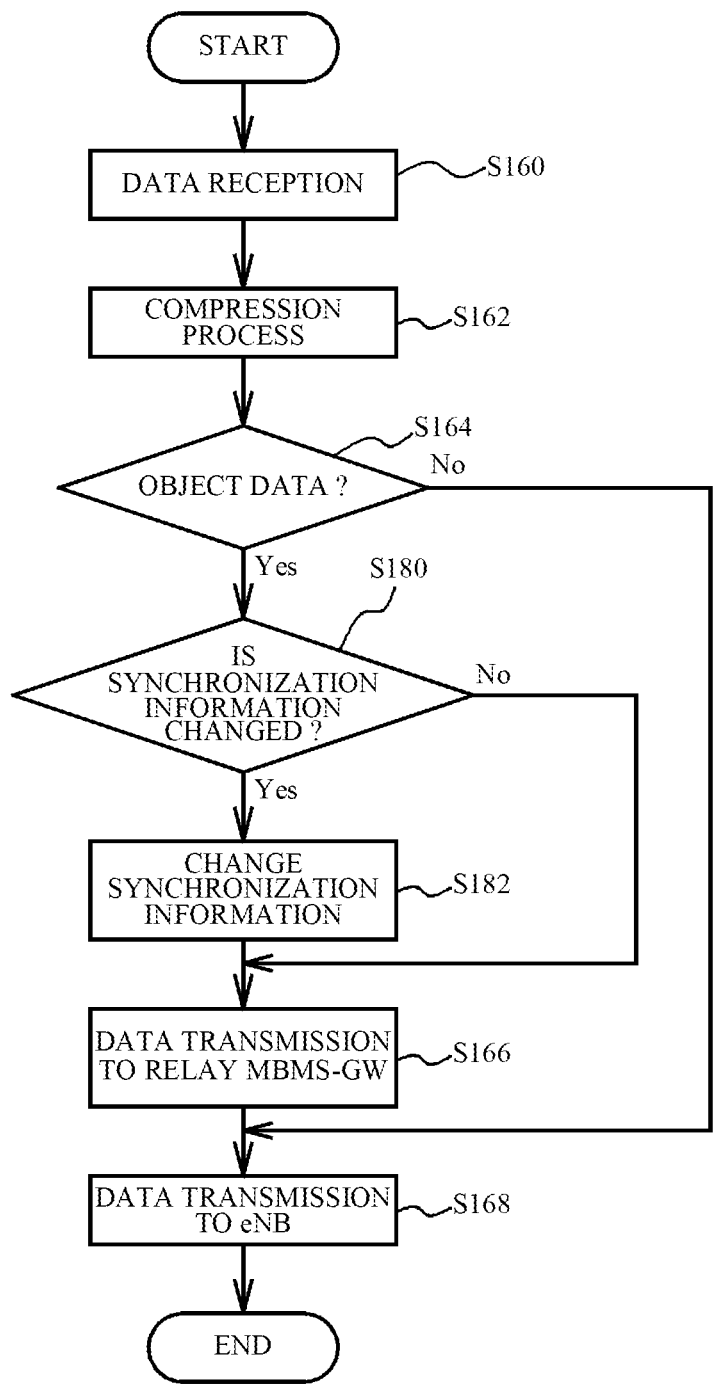
FIG. 19 is a flowchart illustrating processes of the MBMS-GW of the fourth embodiment.

FIG. 19 is a flowchart illustrating processes of the MBMS-GW 10*a* of the fourth embodiment. When the judgment of step S164 is YES, the synchronization information changer 29 judges whether to change the synchronization information (step S180). For example, when the synchronization information changer 29 judges that the time indicative of the time stamp TS added to the IP packet data elapses before the IP packet data reaches the base station 12*b*, the synchronization information changer 29 judges that the unit itself changes the synchronization information. When the judgment of step S180 is NO, the procedure proceeds to step S166. When the judgment of step S180 is YES, the synchronization information changer 29 changes the synchronization information so as to delay the time when the plurality of base stations 12*b* distribute the plurality of IP packet data to the mobile terminal 14 (step S182). For example, the synchronization information is changed in consideration of the distribution delay by the transmission of the IP packet data from the MBMS-GW 10*a* to the MBMS-GW 10*b*. Then, the procedure proceeds to step S166. Since the other steps are the same as FIG. 15, a description thereof is omitted.

According to the fourth embodiment, the synchronization information changer 29 of the MBMS-GW 10*a* changes the synchronization information so as to delay the time when the plurality of base stations 12*b* distribute the plurality of IP packet data to the mobile terminal 14. Thereby, even when data distribution to the base station is delayed by transmitting data between MBMS-GWs 10, the plurality of base stations 12*a* and 12*b* can simultaneously distribute the plurality of IP packet data to the mobile terminal 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A base station controlling apparatus that causes a plurality of base stations to synchronously distribute a plurality of packet data to a mobile terminal, comprising:
  a receiver that receives a plurality of packet data to be synchronously distributed to the mobile terminal;
  a transition information generator that generates transition information corresponding to a sequence number of packet data at which a compression state of the plurality of packet data to be synchronously distributed to the mobile terminal is switched from one of an IR state, a FO state and a SO state to another of the IR state, the FO state and the SO state;
  a compressor that compresses the plurality of packet data to be synchronously distributed to the mobile terminal based on the transition information; and
  a transmitter that transmits the plurality of compressed packet data, to be synchronously distributed to the mobile terminal, to the plurality of base stations, and transmits the transition information to another base station controlling apparatus.

2. The base station controlling apparatus as claimed in claim 1, further comprising:
  a corresponding information generator that generates corresponding information which associates sequence numbers of the plurality of packet data to be synchronously distributed to the mobile terminal with a reference time when the plurality of base stations synchronously distribute the plurality of compressed packet data to the mobile terminal; and
  a synchronization information generator that generates synchronization information corresponding to each of the plurality of packet data to be synchronously distributed to the mobile terminal based on the corresponding information, the synchronization information being used for causing the plurality of base stations to synchronously distribute the plurality of compressed packet data to the mobile terminal;
  wherein the transmitter transmits the corresponding information to the another base station controlling apparatus.

3. The base station controlling apparatus as claimed in claim 1, wherein:

the compressor compresses the plurality of packet data to be synchronously distributed to the mobile terminal so as to switch the compression state at the sequence number;

the another base station controlling apparatus compresses the plurality of packet data to be synchronously distributed to the mobile terminal so as to switch the compression state at the sequence number and transmits the plurality of compressed packet data to be synchronously distributed to the mobile terminal to corresponding base stations.

4. A base station controlling apparatus that causes a plurality of base stations to synchronously distribute a plurality of packet data to a mobile terminal, comprising:

a receiver that receives a plurality of packet data to be synchronously distributed to the mobile terminal, and receives, from an upper control apparatus, transition information corresponding to a sequence number of packet data at which a compression state of the plurality of packet data to be synchronously distributed to the mobile terminal is switched from one of an IR state, a FO state and a SO state to another of the IR state, the FO state and the SO state;

a compressor that compresses the plurality of packet data to be synchronously distributed to the mobile terminal based on the transition information; and a transmitter that transmits the plurality of compressed packet data to the plurality of base stations.

5. A base station controlling apparatus that causes a plurality of base stations to synchronously distribute a plurality of packet data to a mobile terminal, comprising:

a receiver that receives a plurality of packet data to be synchronously distributed to the mobile terminal, and receives, from another base station controlling apparatus, transition information corresponding to a sequence number of packet data at which a compression state of the plurality of packet data to be synchronously distributed to the mobile terminal is switched from one of an IR state, a FO state and a SO state to another of the IR state, the FO state and the SO state;

a compressor that compresses the plurality of packet data to be synchronously distributed to the mobile terminal based on the transition information; and a transmitter that transmits the plurality of compressed packet data to the plurality of base stations.

6. The base station controlling apparatus as claimed in claim 5, wherein the receiver receives, from the another base station controlling apparatus, corresponding information which associates sequence numbers of the plurality of packet data to be synchronously distributed to the mobile terminal with a reference time when the plurality of base stations synchronously distribute the plurality of compressed packet data to the mobile terminal, and the base station controlling apparatus further comprises:

a synchronization information generator that generates synchronization information corresponding to each of the plurality of packet data to be synchronously distributed to the mobile terminal based on the corresponding information, the synchronization information being used for causing the plurality of base stations to synchronously distribute the plurality of compressed packet data to the mobile terminal.

7. A communication system comprising:

a first base station controlling apparatus and a second base station controlling apparatus that receive a plurality of packet data, compress the plurality of packet data, transmit the plurality of compressed packet data to a plurality of base stations, and cause the plurality of base stations to synchronously distribute the plurality of compressed packet data to a mobile terminal;

wherein the first base station controlling apparatus generates transition information corresponding to a sequence number of packet data to be synchronously distributed to the mobile terminal at which a compression state of the plurality of packet data to be synchronously distributed to the mobile terminal is switched from one of an IR state, a FO state and a SO state to another of the IR state, the FO state and the SO state, and transmits the transition information to the second base station controlling apparatus, and the second base station controlling apparatus receives the transition information, and compresses the plurality of packet data to be synchronously distributed to the mobile terminal based on the transition information.

* * * * *